April 30, 1946.   K. R. BOZARTH   2,399,425
ADAPTER FOR BROKEN DRILLS
Filed July 18, 1944

INVENTOR.
KENNETH R. BOZARTH
BY
Donald W. Farrington
ATTORNEY

Patented Apr. 30, 1946

2,399,425

UNITED STATES PATENT OFFICE 2,399,425

ADAPTER FOR BROKEN DRILLS

Kenneth R. Bozarth, Baltimore, Md., assignor to The Glenn L. Martin Company, Middle River, Md., a corporation of Maryland Application July 18, 1944, Serial No. 545,482

1 Claim. (Cl. 279—103)

This invention relates to an adapter to hold drill fragments or the cutting ends of broken drills for further use. It is necessary, in sheet metal work, to drill many small diameter holes from 3/32" to 3/16" for rivets or other fastening devices. In drilling these holes by hand-drills, if too much pressure is placed on the drill, when the cutting edge goes through the sheets of metal, it is very common to snap off the drill anywhere from 3/4" to 1 1/2" from the cutting end, leaving the shank of the drill in the chuck. These small drills are inherently weak due to their size and in an industry such as the aircraft industry where millions of small holes are required for rivets in the fabrication of aircraft structures, this broken end is usually thrown away as it is impossible to hold it satisfactorily in a drill chuck.

An object of this invention is to provide an adapter for the cutting ends of broken drills whereby they may be held in a drill chuck for further use.

Another object of this invention is to provide a means in such an adapter to firmly secure the drill in place in the adapter without any clamping device or other securing means requiring manipulation.

Another object of the invention provides the means for readily removing the broken drill from the adapter.

Further and other objects will become apparent from the description of the accompanying drawing which forms a part of this disclosure and in which like numerals refer to like parts.

Figure 1:
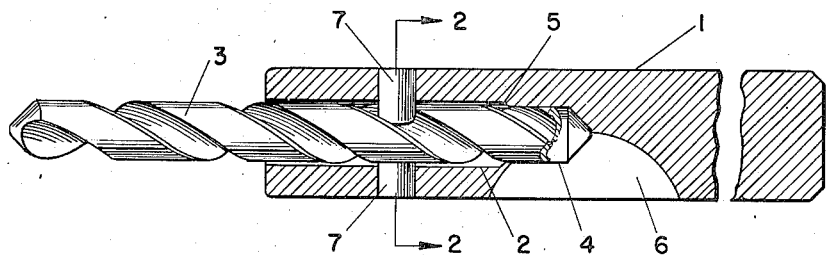
Figure 1 shows a sectional view of the broken drill adapter with a drill in place in the adapter.

Figure 1 of the drawing shows a broken drill adapter generally indicated as 1 which consists of a piece of drill rod of suitable diameter and of a length depending upon the size of the drill inserted in the adapter and the length of the shank desired for the particular job. For example, if an adapter is desired for 1/8" broken drill, the adapter 1 may be made from a piece of 1/4" drill rod approximately 5" or 6" long. A hole 2 is drilled in the rod for a length necessary to engage a sufficient part of the drill fragment 3 to give it stability. Hole 2 in the rod will be of such a diameter that will afford a loose fit between the rod and the drill fragment. The base of hole 2 indicated at 4, will be of such a diameter that it affords a tight fit with the end of the drill so that as the drill is forced into this portion it is tightly gripped. The walls of portion 4 may be tapered to improve the gripping action of the adapter on the drill. Shoulder 5 is tapered to direct the end of the broken drill into hole 4. A slot 6 somewhat less in width than the diameter of the broken drill is milled in the side of the adapter so that it intersects hole 4. Through slot 6 a drift pin may be inserted to knock out the end of the broken drill to remove the drill fragment from the adapter. Pins 7 are sweat-soldered or brazed into holes in the adapter along the length of hole 2. These pins extend into the space occupied by the drill fragment and engage the flutes in the drill to take up some of the shear load between the drill fragment and the adapter. A part of this load is borne by the tight fit between the broken end of the drill and the wall of hole 4.

Figure 2:
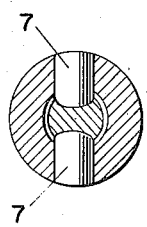
Figure 2 is a sectional view taken on the line 2—2 of Figure 1.
Figure 3:
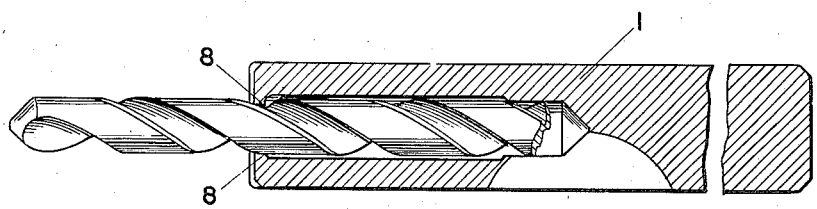
Figure 3 is a modified form of the broken drill adapter showing an alternative method of forming the non-rotating lugs.
Figure 4:
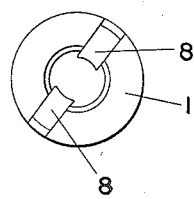
Figure 4 is an end view of the broken drill adapter shown in Figure 3.

Figure 3 is essentially the same construction as that described in Figure 2 except that a swaging operation is performed on the end of the adapter to force projections 8 from the side walls into opening 2 to form flute engaging members similar to member 7 in Figure 1.

The broken drill adapter is furnished in as many sizes as there are diameter drills to be accommodated by such an adapter, and the length of the adapter is a matter of convenience as the portion beyond milled slot 6 need only be long enough to insert in the jaws of the chuck.

In use, the adapter is selected to fit the diameter of the broken drill. The drill fragment is placed in opening 2 by twisting it past the pair of projections, either 7 or 8, until tapered shoulder 5 guides the broken end of the drill fragment into hole 4 where the walls of the hole engage the end of the drill fragment in a tight fit. When used in a chuck, due to the wedging action of projections 7 or 8 on the flutes of the drill, the drill is maintained with a snug fit in the small end of the hole 4. When it is necessary to remove the drill fragment, a drift pin or any other suitable instrument may be inserted through mill cut 6 and the drill knocked out of the adapter.

It is to be understood that certain changes, alterations, modifications and substitutions can be made without departing from the spirit and scope of the appended claim.

I claim as my invention:

An adapter for a fragment of a drill comprising a rod having a hole in one end adapted to receive the end of the drill fragment, said hole for the greater part of its length forming a loose fit with said drill fragment, the base of said hole being of less diameter than the remainder of the hole to form a snug fit with said drill fragment, diametrally opposed projecting means extending into the flutes of the drill to prevent the rotation of the drill in the adapter.

KENNETH R. BOZARTH.